(12) United States Patent
Kittler et al.

(10) Patent No.: US 7,066,491 B2
(45) Date of Patent: Jun. 27, 2006

(54) CASING TUBE OF A STEERING COLUMN OF A MOTOR VEHICLE AND A METHOD FOR PRODUCING THE CASING TUBE

(75) Inventors: Holger Kittler, Hamburg (DE); Hanno Lox, Elmshorn (DE); Christian Spielmannleitner, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 179 days.

(21) Appl. No.: 10/416,230

(22) PCT Filed: Nov. 3, 2001

(86) PCT No.: PCT/EP01/12751

§ 371 (c)(1),
(2), (4) Date: Feb. 13, 2004

(87) PCT Pub. No.: WO02/38430

PCT Pub. Date: May 16, 2002

(65) Prior Publication Data

US 2004/0118239 A1    Jun. 24, 2004

(30) Foreign Application Priority Data

Nov. 9, 2000    (DE) ................................ 100 55 607

(51) Int. Cl.
*B62D 1/11*    (2006.01)
(52) U.S. Cl. ....................................... 280/777; 188/374
(58) Field of Classification Search ................. 280/777; 188/371, 374, 372
See application file for complete search history.

(56) References Cited

U.S. PATENT DOCUMENTS

| 3,369,634 A | * | 2/1968 | Mazelsky | ............... 188/372 |
| 3,523,587 A | * | 8/1970 | Mazelsky | ............... 280/777 |
| 3,635,314 A | * | 1/1972 | Mazelsky | ............... 188/372 |
| 3,899,937 A | | 8/1975 | Nagazumi | |

(Continued)

FOREIGN PATENT DOCUMENTS

| AU | 29955/77 | 4/1979 |
| DE | 2232836 | 2/1973 |
| DE | 2335708 | 1/1974 |
| EP | 0041835 | 12/1981 |

OTHER PUBLICATIONS

J. Banshoya, et al., "Energy-Absorbing Steering Column for Small Cars Utilizes Friction and Plastic Deformation" SAE Journal, vol. 76, No. 7, pp. 36-38, Jul. 1968.

(Continued)

*Primary Examiner*—Paul N. Dickson
*Assistant Examiner*—Barry Gooden, Jr.
(74) *Attorney, Agent, or Firm*—Crowell & Moring LLP

(57) ABSTRACT

The invention relates to a casing tube of a steering column of a motor vehicle, the tube comprising two telescopic tube sections which are connected frictionally to each other in a press fit and, in the event of a crash, can be displaced relative to each other over an axial displacement path. In order, in the case of a vehicle accident, in a simple manner firstly to prevent a hard impact of the driver on the steering wheel and secondly to achieve the greatest possible absorption of impact energy, the tube sections are connected frictionally to each other over the entire displacement path. Furthermore, a method for producing a casing tube of this type is disclosed.

8 Claims, 1 Drawing Sheet

U.S. PATENT DOCUMENTS

| | | | | |
|---|---|---|---|---|
| 4,181,198 | A | * | 1/1980 | Lindberg .................... 188/371 |
| 4,951,492 | A | * | 8/1990 | Vogt .............................. 72/61 |
| 5,174,421 | A | * | 12/1992 | Rink et al. .................. 188/374 |
| 5,623,756 | A | * | 4/1997 | Yanagidate et al. ........... 29/525 |
| 5,718,131 | A | * | 2/1998 | Bobbitt, III .................. 70/184 |
| 6,840,128 | B1 | * | 1/2005 | Shioya et al. ................. 74/492 |
| 6,874,384 | B1 | * | 4/2005 | Freiwald et al. .............. 74/493 |
| 2003/0172765 | A1 | * | 9/2003 | Heiml ......................... 74/493 |
| 2004/0057786 | A1 | * | 3/2004 | Heiml ......................... 403/373 |
| 2005/0285382 | A1 | * | 12/2005 | Ishibashi et al. ............ 280/777 |
| 2005/0285383 | A1 | * | 12/2005 | Yae et al. ................... 280/777 |
| 2006/0001249 | A1 | * | 1/2006 | Fargeas et al. ............. 280/777 |

OTHER PUBLICATIONS

Search Report.

Kenneth MASON Publications, "Shape Memory Alloy Ring Fastened Energy Absorbing Steering Columns and Devices" Research Disclosure, No. 371, Mar. 1, 1995, p. 231.

* cited by examiner

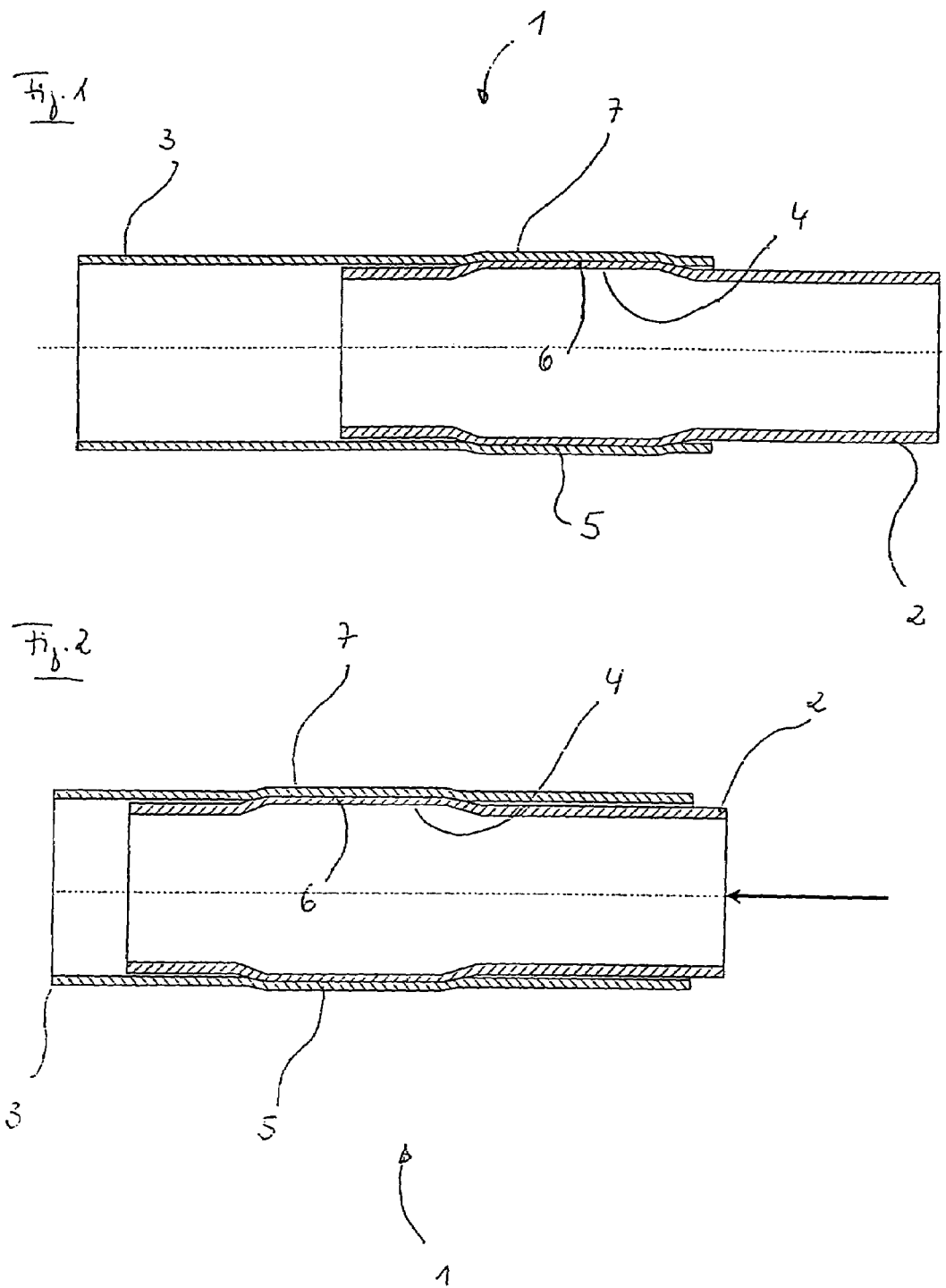

CASING TUBE OF A STEERING COLUMN OF A MOTOR VEHICLE AND A METHOD FOR PRODUCING THE CASING TUBE

BACKGROUND AND SUMMARY OF THE INVENTION

The invention relates to a casing tube of a steering column of a motor vehicle and to a method for producing the same.

A casing tube of the generic type is disclosed in Australian Patent Document No. AU 29955 77 A. In this case, two tube sections are pushed one inside the other, with one end of one of the two tube sections being designed in such a manner that it bears frictionally against the inner or outer circumference of the other tube section. In the event of a crash, the tube sections are pushed further one inside the other, where they remain frictionally connected to each other over the entire displacement path. This results in particularly good absorption of the impact energy.

It is known from German Patent Document No. DE 23 35 708 A1 that two tube sections are pushed one inside the other in such a manner that only their facing ends form an overlapping region. In the pushed-in position achieved, the end of the inner tube section sits with a press fit in the end of the outer tube section, with the outer tube section following the press fit being widened in the manner of a step. In the event of a crash, such a high axial force acts on the steering gear that the press fit is eliminated and the inner tube section enters into the outer tube section without any resistance. This is intended to minimize the risk of injury to the driver should his head strike against the steering wheel. Although the known casing tube at least achieves a softer impact of the head or even avoids it, the casing tube does not make any contribution to the energy absorption which is necessary for preventing injuries to the occupants of the passenger cell, here in particular also in the driver's footwell.

The invention is based on the object of developing a generic casing tube and a production method for it to the effect that, in the case of a vehicle accident, in a simple manner firstly a hard impact of the driver against the steering wheel is prevented and secondly the greatest possible absorption of impact energy is achieved.

Owing to the frictional connection of the telescopic tube connections over their entire displacement path it is permitted firstly, that when the casing tube is subjected to an impact stress, as occurs in a vehicle crash, the tube sections are further pushed together and hence a reduction in the impact hardness for the driver is obtained, and secondly, the permanent frictional work in the relative displacement of the tube sections on each other causes kinetic energy, i.e., impact energy, to be converted to a considerable extent. The design of a functional casing tube of this type can be shown by the invention to be very simple. The starting products used can thus be tubes which can be produced with little complexity and inexpensively, have a rectilinear profile, for example are drawn or produced from a blank and, after shaping by rolling, are welded with a longitudinal seam and, in addition, are of identically shaped design and merely have to have different dimensions, so that they can be inserted one inside the other with play. The loose insertion one inside the other enables the tube sections to be positioned axially very exactly with respect to each other, so that after the frictional connection has been obtained, a casing tube which is virtually free of tolerances in its length is produced in a manner enabling it to be reproduced. The local, relative expansion of the inner tube section relative to the outer tube section in the inserted position of the two tube sections enables the two tube sections to be fixed frictionally on each other without great complexity. The expansion is sufficient for the two tube sections to be connected to each other by a form-fitting connection, as a result of which a particularly high absorption of the impact energy is obtained in a favourable manner. This can take place by thermal shrinking or magnetic pulse deformation of the outer tube section onto the inner tube section with its circumferential size being retained. Equally, the expansion of the inner tube section can be brought about while retaining the circumferential size of the outer tube section, for example by broaching. The frictional connection can be set in a specific manner by selection of the process parameters of the production methods, with it being possible, for the crash situation, for a certain axial displacement force to be established and thus for a uniform force profile to be brought about. With this selection, the force profile can be varied as desired according to requirement.

BRIEF DESCRIPTION OF THE DRAWINGS

The invention is moreover explained in greater detail below with reference to an exemplary embodiment illustrated in the drawings, in which:

FIG. 1 shows, in a lateral longitudinal section, a casing tube according to the invention in a position of the tube sections which is not subjected to axial forces, and FIG. 2 shows, in a lateral longitudinal section, the casing tube from FIG. 1 in a position of the tube sections which is subjected to axial forces.

DETAILED DESCRIPTION OF THE DRAWINGS

FIG. 1 schematically illustrates a casing tube 1 of a steering column of a motor vehicle, the tube comprising two telescopic, identically shaped tube sections 2 and 3. The two tube sections 2 and 3 are connected frictionally to each other in a press fit and, in the event of a crash, can be displaced relative to each other over an axial displacement path. In the present exemplary embodiment, the frictional connection is provided by plastic expansion 4 of the inner tube section 2 and by elastic, resilient deformation 7 of the outer tube section 3. Although the walls 5 and 6 of the tube sections 2 and 3 can bear against each other in the region of the expansion 4 just at certain points, it is advantageous, for the greatest possible transmission of the impact-induced moment of force from the inner tube section 2 to the outer tube section 3 and hence for the degree of absorption of impact energy, for the bearing to be designed to be axial and local, but encircling. In the exemplary embodiment shown, the size of the expansion 4 is maintained in such a manner that a form-fitting connection, which further reinforces the absorption of impact energy, is produced by a marked, elastically expanding deformation 7 of the outer tube section 3 following the contour of the expansion 4 in a manner true to their shape. Owing to the elastically resilient design of the deformation 7, the outer tube section can also be re-used after the crash for the assembly of a new casing tube. The expansion 4 of the tube section 2 can also take place in such a manner that at least visually no expansion or deformation 7 of the tube section 3 can be seen and there is thus no form-fitting connection. Finally, the deformation 7 of the tube section may also be plasticized, as a result of which a force acting axially on the tube section 2 in the event of a crash is counteracted by a greater resistance and the energy absorption action is therefore further increased.

If an axial impact force now acts on the inner tube section 2 in accordance with the arrow direction, the tube section dips, according to FIG. 2, further into the outer tube section 3 virtually until it completely overlaps. With the inner tube section 2 remaining plasticized, the press fit is merely displaced axially and is at no time eliminated, with the result that frictional connection of the tube sections 2, 3 is maintained over the entire displacement path. Kinetic energy is therefore converted into frictional energy in a favourable manner over the entire duration of the impact while the pushing of the tube sections 2, 3 one inside the other means that the steering wheel, which is connected to the casing tube 1, is axially compliant as far as the impact of the driver is concerned, with the result that the driver experiences a "soft" impact. In addition, the form-fitting connection, which exists in the resting position, of the expansion 4 with the deformation 7 of the tube sections 2, 3 as a result of the elasticity of the outer tube section 3 along the entire displacement path has to be permanently overcome, with the result that work of deformation has to be carried out continuously by the inner tube section 2 during the impact. This additionally assists in the absorption of impact energy. Owing to the overlapping zone of the two tube sections 2, 3, the casing tube 1 obtains a double wall there, this providing particularly great rigidity against buckling for the casing tube, the rigidity largely preventing an uncontrolled bending behaviour of the casing tube 1 in the event of a crash. In the variant where the outer casing tube 3 lacks elasticity, the latter is inverted plastically as a consequence of the axial relative displacement of the two tube sections 2, 3, with a high degree of impact energy being converted into deformation energy.

In order to produce the casing tube 1, the two tube sections 2 and 3 are plugged together with play in such a manner that the inner tube section 2 protrudes from the outer tube section 3. In this inserted state, the tube sections 2 and 3 are pressed frictionally together, in which case a frictional connection is set which is only of a magnitude such that the tube sections 2 and 3 can be displaced relative to each other over an axial displacement path in the event of a crash. The inner tube section 2 is expanded plastically by means of a fluidic internal high pressure. This enables the frictional connection between the two tube sections 2, 3 to be set at a desired, defined frictional force in an extremely exact and reproducible manner, with it being possible for the process parameters to be optimally monitored. This makes a substantial contribution to a uniform safety standard, with the casing tube 1 having virtually no dispersion in its crash behaviour. Furthermore, owing to the material of the section 6 being positioned in the region of the expansion 4 against the wall 6 of the section 3 in a manner following the contours, manufacturing tolerances of the two sections 2 and 3, which, due to the great dependence of the axial force on the quality of the contact surfaces of the sections 2, 3 in conventional casing tubes having telescopic tube sections, result in high dispersions of the axial force and therefore in a very inexact assessment of the crash behaviour of the casing tube 1 and therefore of the steering column, so that complicated refinishing work is necessary, are extremely advantageously no longer of significance for this.

In this case, an expansion lance, which is connected to a fluid high pressure generator and has an axial hole and at least one transverse hole opening into an annular channel, filled by radial seals, on the lance casing, is pushed into the tube section 2, with the result that the annular channel comes to lie against the axial location of the expansion 4 which is to be produced. Fluid under pressure is then introduced via the holes and the corresponding location of the section 2 is partially pressurized—in the zone between the two radial seals. As a consequence of this, the wall 5 of the section 2 expands radially there on all sides as expected and is pressed in an encircling manner against the wall 6 of the outer section 3. A prerequisite for the frictional connection which is obtained is that the tube section 3 consists of a material having a higher elasticity limit than the inner section 2. In this manner, after relief of the high pressure of the fluid and relaxation of the elastic deformation part of the two tube sections 2 and 3, a state of equilibrium is established which is based on a positive radial tensile stress of the section 3 and on a negative radial tensile stress of the section 2. Put in more simple terms, the press fit is formed by plastic expansion of the inner section 2 and by elastic, resilient deformation of the outer section 3.

In the example shown, the expansion of the inner tube section 2 is also used to obtain a deformation 7 of the outer section 3, but the deformation lies below the plasticization limit. As a result, both a frictional connection and a form-fitting connection are obtained. However, the formation of a form-fitting connection is not compulsory and is dependent only on the setting of the parameters for the internal high pressure deformation method. Of course, a frictional connection may also be produced without a form-fitting connection. In order to increase the form-fitting connection in respect of increased conversion of impact energy into deformation energy, the two tube sections 2, 3 may also be expanded plastically.

The invention claimed is:

1. A casing tube of a steering column of a motor vehicle, comprising:
   a first telescopic tube section; and
   a second telescopic tube section;
   wherein the first and second tube sections are frictionally connected to each other in a press fit wherein the press fit is formed by a plastic expansion of the first tube section and by an elastic, resilient deformation of the second tube section and, in an event of a crash of the motor vehicle, are displaced relative to each other over an axial displacement path and wherein the first and second tube sections are frictionally connected to each other by the press fit over a total length of the axial displacement path such that:
   at a first position of the press fit alone the axial displacement path a diameter of the second tube section elastically expands at a first location; and
   at a second position of the press fit along the path the diameter of the second tube section elastically expands at a second location and resiliently contracts at the first location;
   and further wherein the first and second tube sections have a form-fitting connection in a resting position.

2. The casing tube according to claim 1, wherein the form-fitting connection is formed by local, circumferential expansion of a wall of the first tube section and a wall of the second tube section, the walls bearing against each other.

3. The casing tube according to claim 2, wherein the form-fitting connection is formed by plastic expansion of the first tube section and by elastic, resilient deformation of the second tube section.

4. A method for producing a casing tube of a steering column of a motor vehicle, comprising the steps of:
   plugging together a first tube section and a second tube section wherein the first tube section protrudes out of the second tube section and wherein the first and second tube sections are identically shaped and are plugged together with play such that the first and second tube sections are pressed frictionally together in a press fit wherein the press fit is formed by a plastic expansion of the first tube section and by an elastic, resilient deformation of the second tube section in such a manner that they are displaceable relative to each other over an axial displacement path in an event of a crash of the motor vehicle, such that:
at a first position of the press fit along the axial displacement path a diameter of the second tube section elastically expands at a first location; and
at a second position of the press fit along the path the diameter of the second tube section elastically expands at a second location and resiliently contracts at the first location; and
locally expanding the first tube section relative to the second tube section to form a region in which a wall of the first tube section bears frictionally against a wall of the second tube section.

5. The method according to claim 4, wherein the step of locally expanding takes place in an encircling manner.

6. The method according to claim 4, wherein the first and second tube sections are connected to each other in the region with a form-fitting connection.

7. The method according to claim 4, wherein the first tube section is locally expanded plastically by fluidic internal high pressure.

8. The method according to claim 4, wherein the second tube section is expanded elastically by locally expanding the first tube section.

* * * * *